US011256618B2

(12) United States Patent
Lin

(10) Patent No.: US 11,256,618 B2
(45) Date of Patent: *Feb. 22, 2022

(54) STORAGE APPARATUS MANAGING SYSTEM COMPRISING LOCAL AND GLOBAL REGISTERING REGIONS FOR REGISTERING DATA AND ASSOCIATED METHOD

(71) Applicant: Silicon Motion, Inc., Hsinchu County (TW)

(72) Inventor: Chao-Yu Lin, Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,956

(22) Filed: Jul. 7, 2020

(65) Prior Publication Data

US 2020/0334141 A1 Oct. 22, 2020

Related U.S. Application Data

(63) Continuation of application No. 16/027,388, filed on Jul. 5, 2018, now Pat. No. 10,776,261.

(Continued)

(30) Foreign Application Priority Data

May 10, 2018 (TW) .................................. 107115913

(51) Int. Cl.
*G06F 12/02* (2006.01)
*G06F 3/06* (2006.01)
(Continued)

(52) U.S. Cl.
CPC .......... *G06F 12/0246* (2013.01); *G06F 3/061* (2013.01); *G06F 3/065* (2013.01);
(Continued)

(58) Field of Classification Search
CPC ........ G06F 3/061; G06F 3/0611; G06F 3/065; G06F 3/0656; G06F 3/0658;
(Continued)

(56) References Cited

U.S. PATENT DOCUMENTS 5,737,750 A 4/1998 Kumar
5,893,920 A 4/1999 Shaheen
(Continued)

OTHER PUBLICATIONS

Lee et al., "Hybrid Cache Architecture Replacing SRAM Cache with Future Memory Technology", 2012 IEEE International Symposium on Circuits and Systems (ISCAS), 2012, pp. 2481-2484, 2012.

(Continued)

*Primary Examiner* — Reginald G Bragdon
*Assistant Examiner* — Aaron D Ho
(74) *Attorney, Agent, or Firm* — Winston Hsu

(57) ABSTRACT

A storage apparatus managing method applied to a first storage apparatus and a second storage apparatus coupled to the electronic apparatus is disclosed. The first storage apparatus includes a local registering region and a global registering region. The storage apparatus managing method includes: when the global registering region does not have a target data unit, reading the target data unit from the local registering region or from the second storage apparatus; and copying the target data unit to the global registering region. When the target data unit is copied to the global registering region, the target data unit is copied to a global registering buffer region, or otherwise in response to the global registering buffer region not having enough space, the target data unit is copied to a global registering file region.

13 Claims, 6 Drawing Sheets

Related U.S. Application Data

(60) Provisional application No. 62/528,978, filed on Jul. 6, 2017.

(51) Int. Cl.
  *G06F 12/0871* (2016.01)
  *G06F 12/0868* (2016.01)

(52) U.S. Cl.
  CPC .......... *G06F 3/0611* (2013.01); *G06F 3/0656* (2013.01); *G06F 3/0658* (2013.01); *G06F 3/0679* (2013.01); *G06F 3/0683* (2013.01); *G06F 12/0871* (2013.01); *G06F 12/0868* (2013.01); *G06F 2212/171* (2013.01); *G06F 2212/2022* (2013.01); *G06F 2212/46* (2013.01); *G06F 2212/463* (2013.01)

(58) Field of Classification Search
  CPC .. G06F 3/0679; G06F 3/0683; G06F 12/0246; G06F 12/0866; G06F 12/0868; G06F 12/0871; G06F 12/0877; G06F 2212/171; G06F 2212/2022; G06F 2212/222; G06F 2212/46; G06F 2212/463
  USPC ........................................................ 711/103
  See application file for complete search history.

(56) References Cited

U.S. PATENT DOCUMENTS

| | | |
|---|---|---|
| 6,105,033 A | 8/2000 | Levine |
| 6,728,856 B2 | 4/2004 | Grosbach |
| 8,112,587 B2 | 2/2012 | Cantin |
| 8,244,960 B2 | 8/2012 | Paley |
| 10,120,582 B1 | 11/2018 | Farhan |
| 2007/0136533 A1 | 6/2007 | Church |
| 2007/0276990 A1 | 11/2007 | Mosek |
| 2009/0031006 A1 | 1/2009 | Johnson |
| 2014/0181402 A1 | 6/2014 | White |
| 2014/0281151 A1 | 9/2014 | Yu |
| 2015/0149721 A1 | 5/2015 | Kannan |

OTHER PUBLICATIONS

Kim et al., "Examining Storage Performance on Mobile Devices", MobiHeld '11: Proceedings of the 3rd ACM SOSP Workshop on Networking, Systems, and Applications on Mobile Handhelds, Oct. 23, 2011, pp. 1-6, Article No. 6, Oct. 23, 2011.

PCMag, "Definition of: SD Card", PCMag.com, captured by web.archive.org on Jun. 24, 2016, retrieved on Dec. 17, 2019 from the Internet URL: https://web.archive.org/web/20160624112321/https://www.pcmag.com/encyclopedia/term/50962/sd-card, Jun. 24, 2016.

Ghosh, "Lecture 19: Cache Memory", 22C:060 Computer Organization, Apr. 1, 2010, University of Iowa, Apr. 1, 2010.

Zhu et al., "Power-Aware Storage Cache Management", IEEE Transactions on Computers, May 2005, pp. 587-602, vol. 54, No. 5, May 2005.

STORAGE APPARATUS MANAGING SYSTEM COMPRISING LOCAL AND GLOBAL REGISTERING REGIONS FOR REGISTERING DATA AND ASSOCIATED METHOD

CROSS REFERENCE TO RELATED APPLICATIONS

This application is a Continuation Application of U.S. application Ser. No. 16/027,388, which was filed on Jul. 5, 2018, which claims priority from U.S. Provisional Application No. 62/528,978, filed on Jul. 6, 2017.

BACKGROUND OF THE INVENTION

1. Field of the Invention

The present invention relates to a storage apparatus managing system and a storage apparatus managing method, and more particularly, to a storage apparatus managing system and a storage apparatus managing method that increase reading speed by providing registering regions in an electronic apparatus.

2. Description of the Prior Art

In recent years, portable electronic apparatus such as mobile phones, tablet computers, and wearable electronic apparatus have become more popular. However, the portable electronic apparatus usually has a problem of small storage space. To increase the capacity of the portable electronic device, it is usually to increase the internal memory storage space of the portable electronic device itself, or to install an external memory card in the portable electronic device. However, the portable electronic apparatus with a large internal memory storage space is usually quite expensive, and the external memory card has a relatively small storage space and is easily lost after being removed from the portable electronic apparatus. Moreover, some portable electronic apparatus do not support the external memory card.

Therefore, a flash disk dedicated to the portable electronic apparatus is becoming more popular. Such a flash disk can not only provide a large memory storage space for portable electronic apparatus, but also facilitate the user to carry. However, limited by the transmission speed of the data transmission interface of the portable electronic apparatus, the data accessing speed of the flash drive is usually quite limited.

Therefore, there is a need for a method or system that can increase the accessing speed of the flash disk.

SUMMARY OF THE INVENTION

Therefore, an object of the present invention is to provide a storage apparatus managing system that can increase the data reading speed.

Another object of the present invention is to provide a storage apparatus managing method that can increase the data reading speed.

According to a first aspect of the present invention, a storage apparatus managing method applied to a first storage apparatus and a second storage apparatus coupled to the electronic apparatus is disclosed. The first storage apparatus comprises a local registering region and a global registering region, the global registering region is utilized for registering data that has been read from the second storage apparatus, and the local registering region is utilized for registering data that has been read from the second storage apparatus and other candidate data. The storage apparatus managing method comprises: receiving a read request indicating reading a target data unit from the second storage apparatus; confirming whether the global registering region has the target data unit; if the global registering region has the target data unit, reading the target data unit from the global registering region, if the global registering region does not have the target data unit, confirming whether the local registering region has the target data unit; reading the target data unit from the local registering region if the local registering region has the target data unit, and reading the target data unit from the second storage apparatus if the local registering region does not have the target data unit; and copying the target data unit to the global registering region if the target data unit is read from the local registering region or the second storage apparatus. The global registering region comprises a global registering buffer region and a global registering file region, the global registering buffer region stores non-file data, and the global registering file region stores files. When the target data unit is copied to the global registering region, it is first confirmed whether there is enough space in the global registering buffer region. In response to the global registering buffer region having enough space, the target data unit is copied to the global registering buffer region, or otherwise in response to the global registering buffer region not having enough space, it is confirmed whether there is enough space in the global registering file region. In response to the global registering file region having enough space, the target data unit is copied to the global registering file region.

According to a second aspect of the invention, in response to the global registering buffer region not having enough space, at least one part of the data of the global registering buffer region is converted to at least one file and stored in the global registering file region, then the target data unit is stored in the global registering buffer region.

According to a third aspect of the invention, the data stored in the global registering region is deleted in response to detecting that the second storage apparatus is removed from the electronic apparatus.

According to a fourth aspect of the invention, the read target data unit is modified to be a modified target data unit, and when writing the modified target data unit into the second storage apparatus to replace the target data unit, if the local registering region or the global registering region has the modified target data unit, then the modified target data unit is also written into the local registering region or the global registering region to replace the target data unit.

A storage apparatus managing system for managing a first storage apparatus and a second storage apparatus coupled to an electronic apparatus is also disclosed. The first storage apparatus comprises a local registering region and a global registering region, the global registering region is utilized for registering data that has been read from the second storage apparatus, and the local registering region is utilized for registering data that has been read from the second storage apparatus and other candidate data. The storage apparatus managing system comprises: a processor, storing a storage apparatus managing program; and a control circuit, for controlling the second storage apparatus. The storage apparatus managing system can perform the storage apparatus managing method corresponding to the above embodiments. The operation of the storage apparatus managing system can be derived from the embodiments described above, and therefore will not be described herein.

According to the above embodiments, by providing the registering region in the electronic apparatus, the data reading speed of the electronic apparatus can be greatly increased, so as to improve the problem of slow data reading speed in the prior art.

These and other objectives of the present invention will no doubt become obvious to those of ordinary skill in the art after reading the following detailed description of the preferred embodiment that is illustrated in the various figures and drawings.

DETAILED DESCRIPTION

In the following description, several embodiments are provided to illustrate the concept of the present invention. Please note, in the following embodiments, each component can be implemented in a hardware manner (for example, a circuit) or in a hardware plus software manner (for example, a program written in a processor). In addition, the following embodiments are only utilized for illustration, and the number, location, and operation sequence of the components are not intended to limit the present invention.

Figure 1:
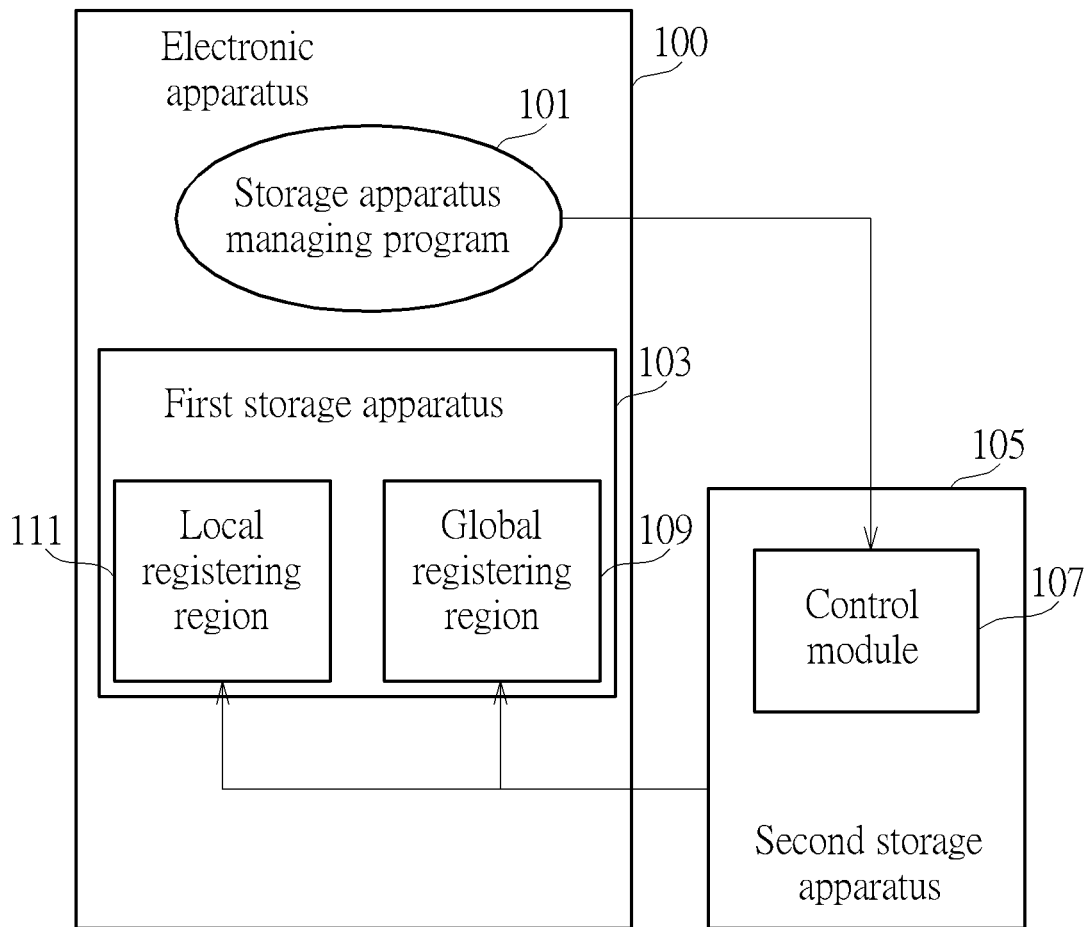
FIG. 1 is a block diagram of a storage apparatus managing system according to an embodiment of the present invention.

FIG. 1 is a block diagram of a storage apparatus managing system according to an embodiment of the present invention. As shown in FIG. 1, the electronic apparatus 100 comprises a storage apparatus managing program 101 and a first storage apparatus 103 (such as cache memory in the electronic apparatus 100, Cached RAM). The second storage apparatus 105 (such as a flash disk) is coupled to the electronic apparatus 100, and comprises a control module 107. The second storage apparatus 105 can be removed from the electronic apparatus 100. The storage apparatus managing program 101 can control the data access or region division operations of the first storage apparatus 103 and the second storage apparatus 105 by using a file system module (for example, a FATFS file system module) corresponding to the file system of the first storage apparatus 103 and the second storage apparatus 105. The file system module can be installed in the second storage apparatus 105, but can also be installed in the electronic apparatus 100. In addition, the storage apparatus managing program 101 can define a global registering region 109 and a local registering region 111 in the first storage apparatus 103 and manage the access operations of the global registering region 109 and the local registering region 111. In an embodiment, the global registering region 109 is utilized to register data that has been read from the second storage apparatus 105, and the local registering region 111 is utilized to temporarily store data that has been read from the second storage apparatus 105 and other candidate data.

Moreover, the storage apparatus managing program 101 is also utilized to generate a read or write command to the control module 107, so that the control module 107 transfers the data of the second storage apparatus 107 to the first storage apparatus 103 or writes data to the second storage apparatus 107 according to read or write command. The storage apparatus managing program 101 can be executed by a processor. The processor can be a processor of the electronic apparatus 100. That is, the processor can be utilized for controlling other functions of the electronic apparatus 100 in addition to executing the storage apparatus managing program 101, and the storage apparatus managing program 101 can also be executed by another processor independent of the processor. The storage apparatus managing program 101 and the control module 107 can be regarded as a storage apparatus managing system. However, please note that in the following embodiments, the control module is disposed in the second storage apparatus, and the control module can also be disposed in the electronic apparatus.

The electronic apparatus 100 can be a portable electronic apparatus such as a mobile phone or a tablet computer. The first storage apparatus 103 can be an internal storage apparatus of the electronic apparatus 100 such as a Random Access Memory (RAM). The internal storage apparatus can be a storage apparatus that is set when the electronic apparatus 100 is shipped, and it is difficult to change its capacity. In addition, the second storage apparatus 105 can be an external storage apparatus independent of the electronic apparatus 100, such as a flash disk or a memory card, etc. Such external storage apparatus can be freely attached to or removed from the electronic apparatus. Also, when the first storage apparatus 103 is an internal storage apparatus and the second storage apparatus 105 is an external storage apparatus, the data access speed of the first storage apparatus 103 is higher than the data access speed of the second storage apparatus 105.

In the prior art, if the data in the second storage apparatus 105 is to be read, the data is directly read from the second storage apparatus 105. As described above, the data reading speed can be limited by the speed of the data transmission interface between the second storage apparatus 105 and the electronic apparatus 100. Therefore, one of the concepts of the present invention is to copy at least one part of the data in the second storage apparatus 105 to the global registering region 109 or the local registering region 111 in the first storage apparatus 103. When reading the data, firstly confirm whether there is data to be read in the first storage apparatus 103, and if there is, preferentially read the data from the first storage apparatus 103, and if there is not, read from the second storage apparatus 105. In this way, the time of data reading can be greatly reduced. Detailed steps will be explained below.

Figure 2:
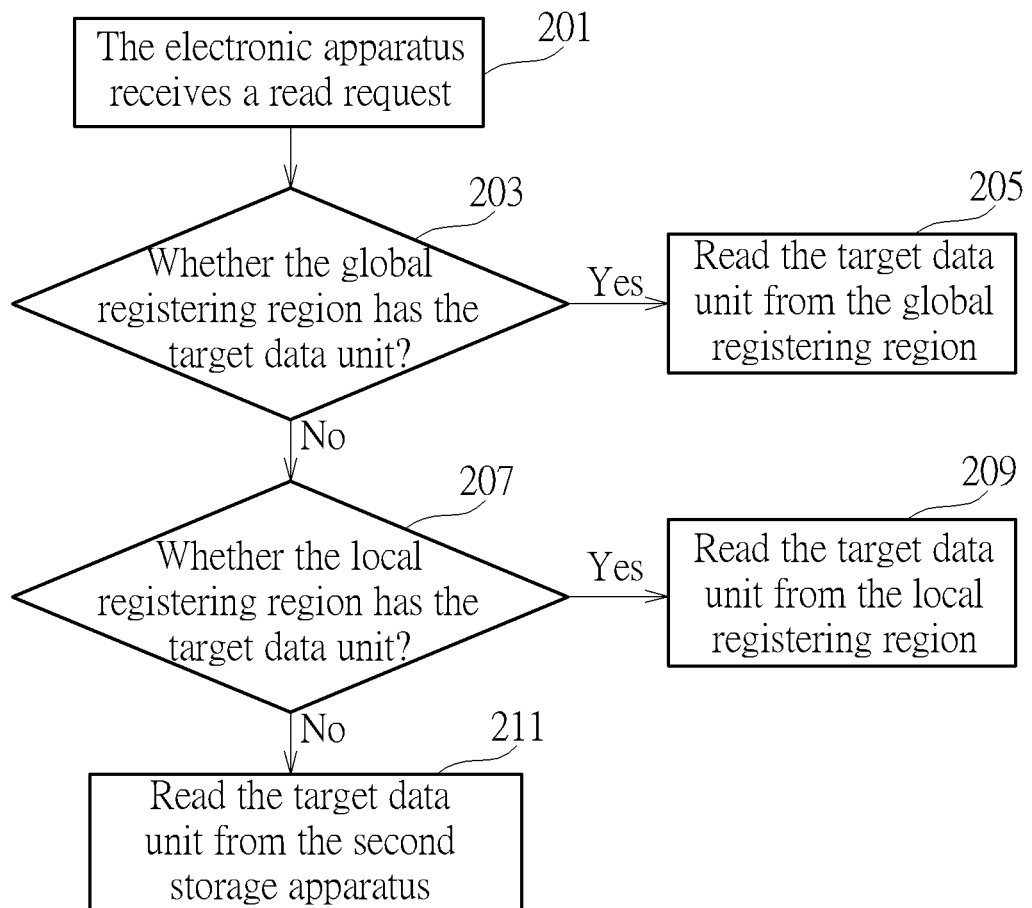
FIG. 2 illustrates a flowchart of a storage apparatus managing method according to an embodiment of the present invention.

FIG. 2 is a flowchart of a method for managing a storage apparatus according to an embodiment of the present invention. The method comprises the following steps:

Step 201

The electronic apparatus 100 receives a read request.

For example, the user wants to read the target data unit in the second storage apparatus 105 through the electronic apparatus 100. The target data unit can be any form of data, for example, a file or a Logical Block Address (LBA). In the following embodiment, the target data unit is LBA.

Step 203

Confirm whether there is a target data unit in the global registering region 109, and if there is, then the process goes to the step 205; otherwise, the process goes to the step 207.

In an embodiment, the global registering region 109 comprises data (for example, LBA) not yet written as a file and data that has been written as a file. In this embodiment, step 203 firstly confirms whether the non-file data in the global registering region comprises the target data unit. If the non-file data in the global registering region does not comprise the target data unit, it confirms whether the file in the global registering region comprises the target data unit. This step can make the reading speed faster. The reason is that when confirming whether the file includes the target data unit, the process of opening the file to confirm the included data and then closing the file will increase the time required for confirmation. Therefore, it is preferable to check whether the non-file data in the global registering region comprises the target data unit.

Step 205

Read the target data unit from the global registering region 109.

Step 207

Confirm whether the local registering region 111 has the target data unit, and if yes, the process goes to the step 209; otherwise, the process goes to the step 211.

Step 209

Read the target data unit from the local registering region 111.

Step 211

Read the target data unit from the second storage apparatus 105.

In accordance with the steps in FIG. 2, the storage apparatus managing method provided in the present invention preferentially reads data from the first storage apparatus 103, and reads data from the second storage apparatus 105 if the first storage apparatus 103 does not has the data. Therefore, the amount of data transmitted by the data transmission interface between the second storage apparatus 105 and the electronic apparatus 100 can be reduced, and the data reading speed can be improved. In detail, when the electronic apparatus 100 receives the read request for reading the target data unit from the second storage apparatus 105, the electronic apparatus 100 firstly confirms whether there is a target data unit in the global registering region 109, and if there is, then the electronic apparatus 100 reads the target data unit from the global registering region 109 first, and if there is no target data unit in the global registering region 109, then the electronic apparatus 100 reads the target data unit from the local registering region 111. If the global registering region 109 and the local registering region 111 do not have the target data unit, then the electronic apparatus 100 reads the target data unit from the second storage apparatus 105. In this way, the electronic apparatus 100 does not have to read the data from the second storage apparatus 105 every time when it is requested to read the data, and the data reading speed can be increased.

In the following embodiments, how to decide to register what data in the global registering region 109 and the local registering region 111 will be described in detail, and the contents of the present invention can be more fully understood with reference to FIG. 2 and FIG. 3-4. Through the following registering method, the global registering region 109 and the local registering region 111 can store data that may be read, so as to enhance the efficiency of reading data from the global registering region 109 and the local registering region 111 but not the efficiency of reading data from the second storage apparatus 105.

Figure 3:
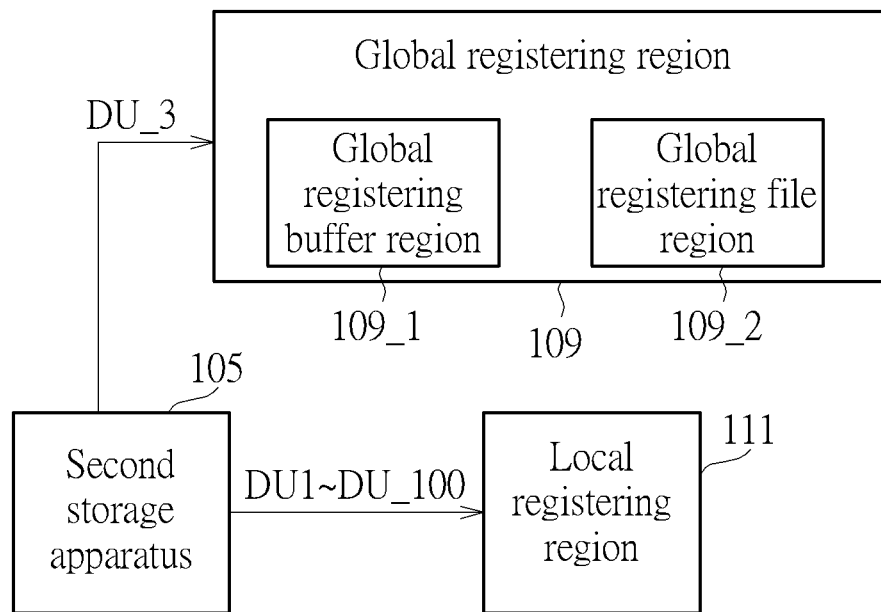
FIG. 3-4 illustrate an operation schematic diagram of a storage apparatus managing system according to an embodiment of the present invention.

In the embodiment of FIG. 3, it is assumed that the target data unit to be read is the data unit DU_3, and in the embodiment of FIG. 3, both the global registering region 109 and the local registering region 111 do not comprise the data unit DU_3. In this case, in addition to reading the data unit DU_3 from the second storage apparatus, the data unit DU_3 is also copied to the global registering region 109 and the local registering region 111, and besides the data unit DU_3, at least one candidate data unit except the non-target data will be copied to the local registering region 111, such as the data units DU_1-DU_2 and the data unit DU_4-DU_100 in FIG. 3, that is, the data unit within one address range of the data unit DU_3. The advantage of adopting this mechanism is that because the data unit may not be read individually, it may be read continuously. For example, when reading a file, the data units adjacent to the memory address are read continuously. Therefore, the data units within one address range of the data unit DU_3 are firstly copied to the local registering region 111 to reduce the possibility of directly reading data from the second storage apparatus 105. After such a copying operation, the global registering region 109 and the local registering region 111 both comprise the data unit DU_3. Therefore, if the data unit DU_3 is to be read again, the steps in FIG. 2 will directly start from reading the data unit DU_3 from the global registering region 109 without having to read from the second storage apparatus 105 again.

Figure 4:
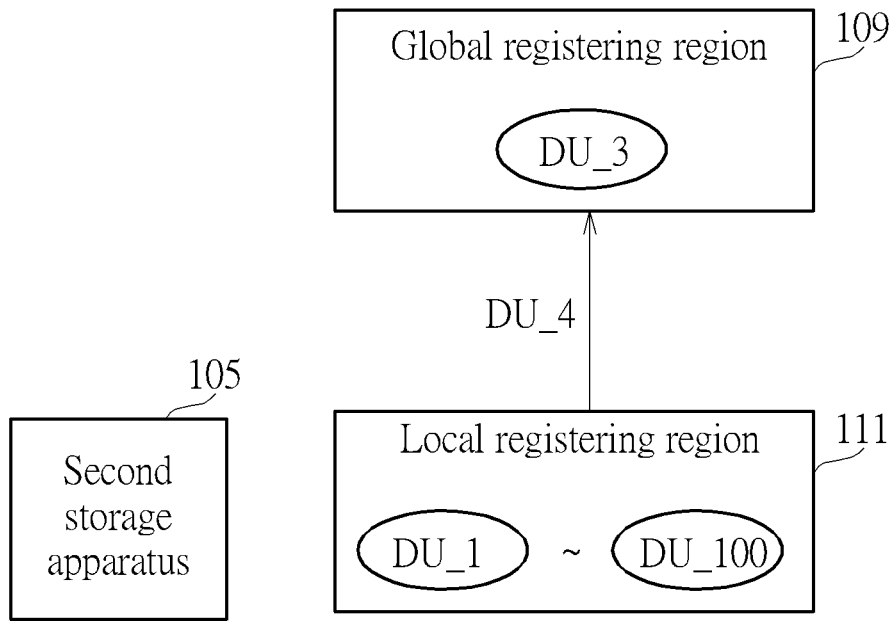

The embodiment of FIG. 4 is followed by the embodiment of FIG. 3, that is, in the embodiment of FIG. 4, the global registering region 109 comprises the data unit DU_3, and the local registering region 111 comprises the data units DU_1-DU_100. In the embodiment of FIG. 4, the target data unit to be read is the data unit DU_4. In accordance with the steps shown in FIG. 2, the present invention will firstly confirm whether the global registering region 109 has the data unit DU_4, but since the global registering region 109 does not comprise the data unit DU_4, the present invention will further confirm whether the local registering region 111 has the data unit DU_4. The local registering region 111 comprises the data unit DU_4, so the present invention will read the data unit DU_4 from the local registering region 111, and copy the data unit DU_4 from the local registering region 111 to the global registering region 109.

Figure 5:
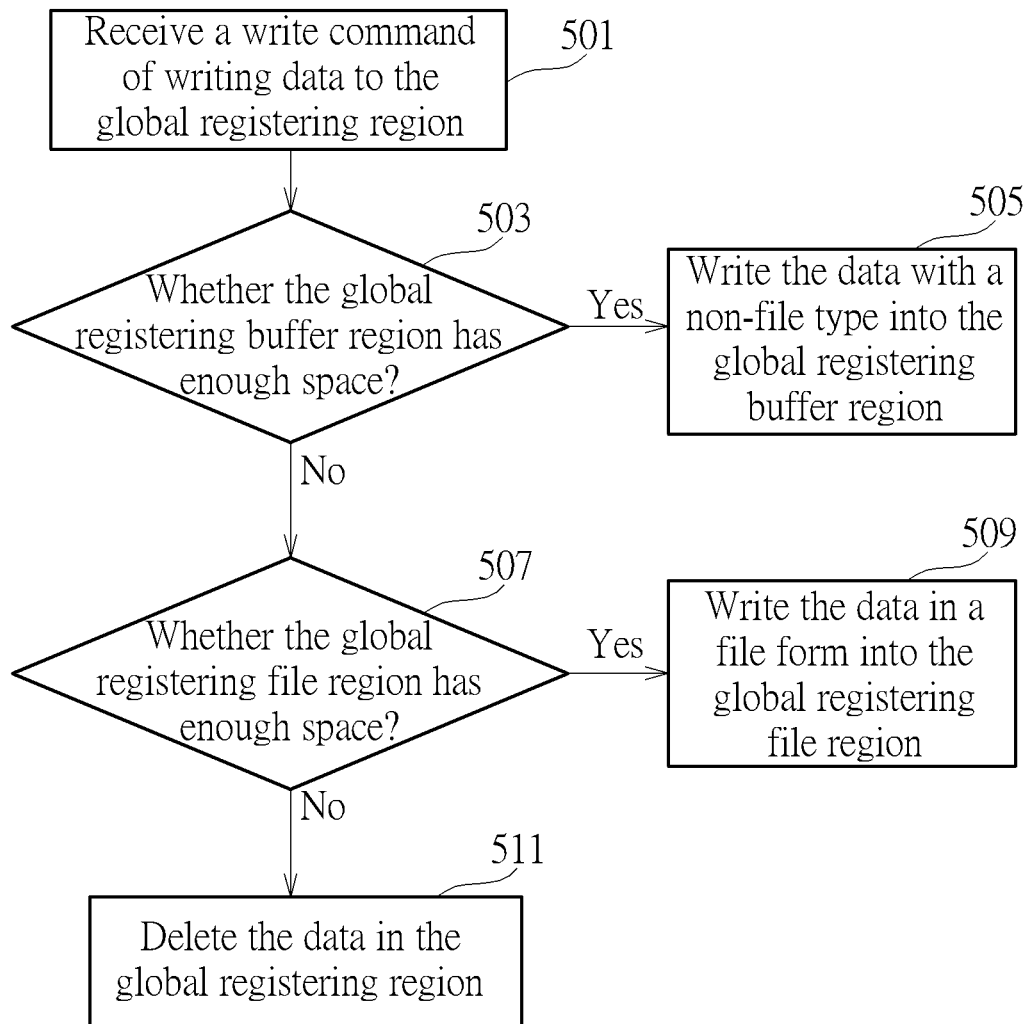
FIG. 5 illustrates a flowchart of writing data to a global registering region according to an embodiment of the present invention.

As described above, if the target data unit is read from the local registering region 111 or the second storage apparatus 105, then the target data unit will be copied to the global registering region 109. Therefore, the present invention further provides an embodiment for writing data into the global registering region 109, which can further increase data reading speed. FIG. 5 illustrates a flowchart of writing data to a global registering region in accordance with an embodiment of the present invention. The present invention can be further understood by referring to FIG. 3 and FIG. 5 at the same time. In an embodiment, the global registering region 109 in FIG. 3 further comprises a global registering buffer region 109_1 and a global registering file region 109_2. The global registering buffer region 109_1 is configured to store the non-file data and the global registering file region 109_2 is configured to save the file. The flowchart of FIG. 5 comprises the following steps:

Step 501

Receive a write command of writing data to the global registering region 109. For example, copy the target data unit to the global registering region 109 as described above.

The control module 107 in FIG. 1 receives the write command generated by the storage apparatus managing program 101.

Step 503

Confirm whether there is enough space in the global registering buffer region 109_1. If yes, go to the step 505; otherwise, go to the step 507.

Step 505

Write the data in a non-file form into the global registering buffer region 109_1.

Step 507

Confirm whether there is enough space in the global registering file region 109_2. If yes, go to the step 509; otherwise, go to the step 511.

Step 509

Write the data in a file form into the global registering file region 109_2.

Step 511

If neither the global registering buffer region 109_1 nor the global registering file region 109_2 has enough storage space, it means that the storage space of the global registering region 109 is quite low. In this case, the data in the global registering region 109 can be deleted. This delete operation can delete all the data stored in the global registering region 109, or can only delete some of the data stored in the global registering region 109. For example, only the older data of the global registering region 109 can be deleted.

In an embodiment, the steps 507-511 can be replaced by writing at least one part of the data stored in the global registering buffer region 109_1 into a file and storing the file in the global registering file region 109_2 to release a part of the space of the global registering buffer region 109_1, and write new data to the global registering buffer region 109_1.

As mentioned before, if the data is saved as a file, it has to open the file when searching the data, and then reads the file, and then closes the file, and this process will reduce the speed of accessing the data. Therefore, in the global registering region writing flow of FIG. 5, data will be stored in the non-file form preferentially, which can increase the speed of reading data in the global registering region.

In an embodiment, since the global registering region 109 and the local registering region 111 comprise a fixed space, the present invention further provides another embodiment of deleting the data stored in the global registering region 109 or the local registering region 111 in a specific situation to avoid insufficient space in the global registering region 109 and the local registering region 111. As described in the embodiment of FIG. 5, if neither the global registering buffer region 109_1 nor the global registering file region 109_2 has enough storage space, the data in the global registering region 109 will be deleted. In addition, in an embodiment, if the second storage apparatus 105 is removed from the electronic apparatus 100, the data stored in the global registering region 105 is not able to be corresponding to another storage apparatus, and therefore the data in the global registering region 109 is deleted.

In another embodiment, after reading a file comprising the required data unit from the local registering region 111, the global registering region 109, or the second storage apparatus 105, delete the candidate data units stored in the local registering region 111. Taking the embodiment of FIG. 3 as an example, if there is a file A comprising the data unit DU_3-DU_50, then after reading the data unit DU_3, continue to read the remaining DU_4-DU_50 in accordance with the flow in FIG. 2. After reading the file A, since the candidate data unit stored in the local registering region 111 is a data unit related to the file A, the candidate data unit stored in the local registering region 111 will be deleted.

Figure 6:
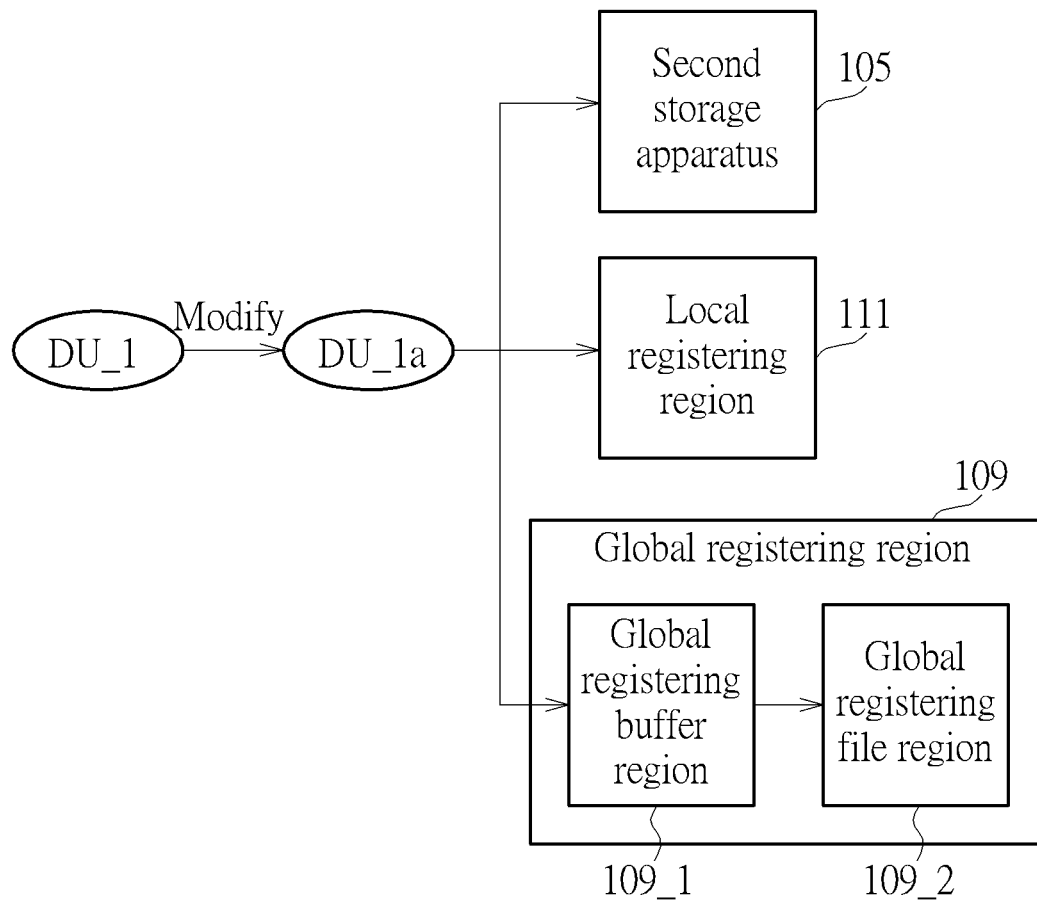
FIG. 6 is a schematic diagram of an operation when the data of the second storage apparatus is modified according to an embodiment of the present invention.

The user may modify the data originally stored in the second storage apparatus 105, and then store the modified data in the second storage apparatus 105. In an embodiment, in this case, the global registering region 109 and the local registering region 111 will be updated at the same time so as to synchronize the data. Please refer to FIG. 6, which is a schematic diagram of an operation when the data of the second storage apparatus is modified in accordance with an embodiment of the present invention. As shown in FIG. 6, after the required data unit DU_1 is read out, according to the above embodiment, the required data unit DU_1 will be stored in the global registering region 109 and the local registering region 111 no matter the required data unit DU_1 is read from the second storage apparatus 105, the global registering region 109, or the regional buffer area 111. If the content of the required data unit DU_1 is changed and modified to be the modified required data unit DU_1a, and stored into the second storage apparatus 105 to replace the original required data unit DU_1, then the modified required data unit DU_1a must be stored in the global registering region 109 and the local registering region 111 at the same time to replace the existing required data unit DU_1. Otherwise, when reading the modified required data unit DU_1a next time, it will read the original required data unit DU_1 from the global registering region 109 or the local registering region 111 instead of the modified data unit DU_1a.

In an embodiment, after the required data unit DU_1 is read and modified to be the modified required data unit DU_1a, it will determine whether the required data unit DU_1 exists in the local registering region 111. If the result is yes, then it will use the modified required data unit DU_1a to replace the required data unit DU_1 in the local registering region 111. Similarly, it will also determine whether the required data unit DU_1 exists in the global registering region 109. If the result is yes, then it will use the modified required data unit DU_1a to replace the required data unit DU_1 in the global registering region 109.

In an embodiment, the global registering region 109 comprises the global registering buffer region 109_1 (non-file data region) and the global registering file region 109_2 (file data region) mentioned above. When updating the modified required data unit DU_1a to the global registering region 109, it will firstly confirm whether the required data unit DU_1 exists in the global registering buffer region 109_1. If yes, then it will use the modified required data unit DU_1a to replace the required data unit DU_1 in the global registering buffer region 109_1. If there is no required data unit DU_1 in the global registering buffer region 109_1 but the required data unit DU_1 exists in the global registering file region 109_2, then it will use the modified required data unit DU_1a to replace the required data unit DU_1 in the global registering file region 109_2. As described in the step of FIG. 5 in this case, there can be a case where the global registering buffer region 109_1 is insufficient in space but the global registering file region 109_2 still has space when writing the required data unit to the global registering buffer region 109. Therefore, the required data unit DU_1 may exist in the global registering file region 109_2 but not in the global registering buffer region 109_1.

Figure 7:
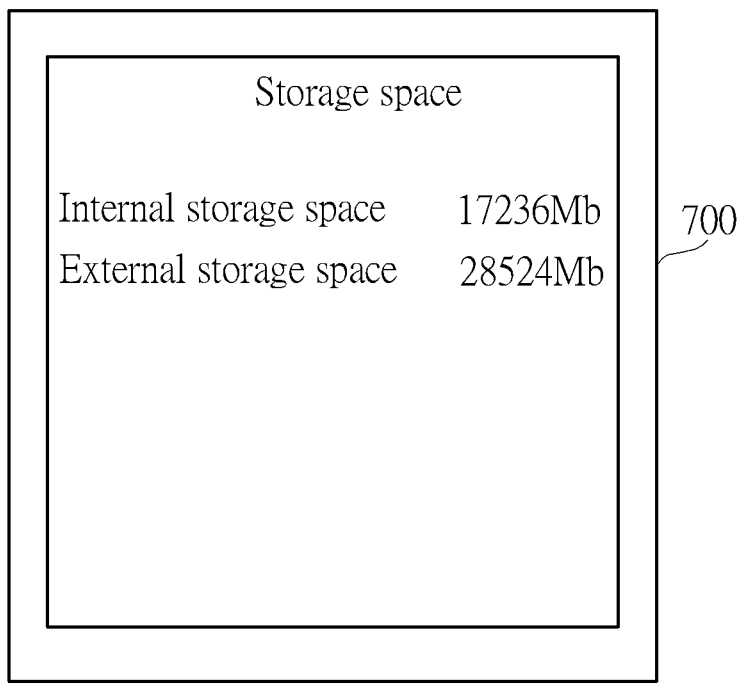
FIG. 7 is a diagram illustrating an electronic apparatus utilizing a storage apparatus managing system or storage apparatus managing method according to an embodiment of the present invention.
Figure 7:
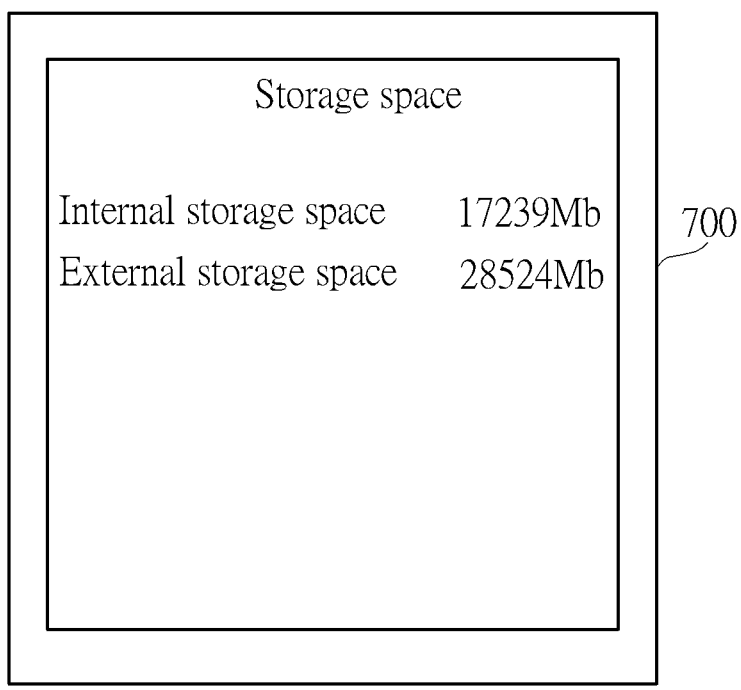

As described above, when reading the data of the second storage apparatus, the prior art reads the data directly from the second storage apparatus and therefore does not change the first storage apparatus in the electronic apparatus. Therefore, if an electronic apparatus uses the storage apparatus managing method provided by the present invention, the data of the first storage apparatus in the electronic apparatus will correspondingly increase when the second storage apparatus is read. FIG. 7 shows a diagram illustrating an electronic apparatus utilizing a storage apparatus managing system or storage apparatus managing method according to an embodiment of the present invention.

FIG. 7 is a diagram illustrating the electronic apparatus utilizing a storage apparatus managing system or storage apparatus managing method according to an embodiment of the present invention. In FIG. 7, the first storage apparatus mentioned above is an internal storage apparatus and the second storage apparatus mentioned above is an external storage apparatus. As shown in FIG. 7, the electronic apparatus 700 can display a configuration screen of a storage space, which shows the internal storage space and the external storage space. When reading the data of the external storage apparatus, since the data is temporarily stored in the first storage apparatus, the internal storage space may correspondingly increase. As described above, in an embodiment, if the second storage apparatus is removed from the electronic apparatus, the data stored in the global registering region 109 and the local registering region 111 will be deleted. Therefore, if the second storage apparatus is removed from the electronic apparatus, there can be a corresponding reduction in the internal storage space. The internal storage space change caused by the above embodiment can be derived according to the description of FIG. 7, so it will not be repeated here.

According to the above embodiments, by providing the registering region in the electronic apparatus, the data reading speed of the electronic apparatus can be greatly increased, so as to improve the problem of slow data reading speed in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage apparatus managing method, applied to a first storage apparatus and a second storage apparatus coupled to an electronic apparatus, wherein the first storage apparatus comprises a local registering region and a global registering region, the global registering region is utilized for registering data that has been read from the second storage apparatus, and the local registering region is utilized for registering data that has been read from the second storage apparatus and other candidate data, the storage apparatus managing method comprising:
(a) receiving a read request indicating reading a target data unit from the second storage apparatus;
(b) confirming whether the global registering region has the target data unit;
(c) if the global registering region has the target data unit, reading the target data unit from the global registering region, if the global registering region does not have the target data unit, confirming whether the local registering region has the target data unit;
(d) reading the target data unit from the local registering region if the local registering region has the target data unit, and reading the target data unit from the second storage apparatus if the local registering region does not have the target data unit; and
(e) copying the target data unit to the global registering region if the target data unit is read from the local registering region or the second storage apparatus;

wherein the global registering region comprises a global registering buffer region and a global registering file region, the global registering buffer region stores non-file data, and the global registering file region stores files; wherein when the target data unit is copied to the global registering region, firstly confirming whether there is enough space in the global registering buffer region; in response to the global registering buffer region not having enough space, confirming whether there is enough space in the global registering file region; and in response to the global registering file region having enough space, copying the target data unit to the global registering file region.

2. The storage apparatus managing method of claim 1, wherein the first storage apparatus is an internal storage apparatus inside the electronic apparatus, and the second storage apparatus is an external storage apparatus independent of the electronic apparatus.

3. The storage apparatus managing method of claim 1, wherein the step (b) further comprises:
firstly confirming whether non-file data of the global registering region comprises the target data unit; if not, then confirming whether file of the global registering region comprises the target data unit.

4. The storage apparatus managing method of claim 1, further comprising:
deleting the data stored in the global registering region in response to detecting that the second storage apparatus is removed from the electronic apparatus.

5. The storage apparatus managing method of claim 1, further comprising:
after reading the target data unit from the second storage apparatus, copying at least one candidate data unit comprising the target data unit to the local registering region.

6. The storage apparatus managing method of claim 5, further comprising:
after reading a file comprising the target data unit from the local registering region, the global registering region, or the second storage apparatus, deleting the at least one candidate data unit stored in the local registering region.

7. The storage apparatus managing method of claim 1, further comprising:
modifying the read target data unit to be a modified target data unit, and when writing the modified target data unit into the second storage apparatus to replace the target data unit, if the local registering region or the global registering region has the modified target data unit, then also writing the modified target data unit into the local registering region or the global registering region to replace the target data unit.

8. The storage apparatus managing method of claim 1, wherein the storage apparatus managing method is further applied to a cache memory utilized in a mobile phone and a flash disk coupled to the mobile phone, comprising:
when reading a target data unit from the flash disk, copying the target data unit to the cache memory; and
reading the target data unit from the flash disk or the cache memory.

9. The storage apparatus managing method of claim 8, further comprising:
in response to detecting the flash disk is removed from the mobile phone, deleting at least one part of internal storage data stored in the cache memory.

10. The storage apparatus managing method of claim 8, wherein the step of copying the target data unit to the cache memory comprises:

copying a plurality of candidate data units comprising the target data unit to the cache memory.

11. The storage apparatus managing method of claim 10, further comprising:

after reading data comprising the target data unit from the cache memory or the flash disk, detecting the candidate data units stored in the cache memory.

12. The storage apparatus managing method of claim 8, further comprising:

modifying the read target data unit into a modified target data unit, and writing the modified target data unit to the flash disk to replace the target data unit, and also writing the modified target data unit to the cache memory to replace the target data unit.

13. A storage apparatus managing method, applied to a first storage apparatus and a second storage apparatus coupled to an electronic apparatus, wherein the first storage apparatus comprises a local registering region and a global registering region, the global registering region is utilized for registering data that has been read from the second storage apparatus, and the local registering region is utilized for registering data that has been read from the second storage apparatus and other candidate data, the storage apparatus managing method comprising:

(a) receiving a read request indicating reading a target data unit from the second storage apparatus;

(b) confirming whether the global registering region has the target data unit;

(c) if the global registering region has the target data unit, reading the target data unit from the global registering region, if the global registering region does not have the target data unit, confirming whether the local registering region has the target data unit;

(d) reading the target data unit from the local registering region if the local registering region has the target data unit, and reading the target data unit from the second storage apparatus if the local registering region does not have the target data unit; and (e) copying the target data unit to the global registering region if the target data unit is read from the local registering region or the second storage apparatus;

wherein the global registering region comprises a global registering buffer region and a global registering file region, the global registering buffer region stores non-file data, and the global registering file region stores files;

wherein when the target data unit is copied to the global registering region, firstly confirming whether there is enough space in the global registering buffer region; in response to the global registering buffer region not having enough space, converting at least one part of the data of the global registering buffer region to at least one file and storing the at least one file in the global registering file region, and then storing the target data unit in the global registering buffer region.

* * * * *